United States Patent
Gering

[19]

[11] Patent Number: 6,128,562

[45] Date of Patent: Oct. 3, 2000

[54] CONTROL UNIT ACTUATING A TRIGGERING DEVICE FOR A SEAT BELT PRETENSIONER IN A VEHICLE

[75] Inventor: Horst Gering, Regensburg, Germany

[73] Assignee: Siemens Aktiengesellschaft, Munich, Germany

[21] Appl. No.: 09/033,121

[22] Filed: Mar. 2, 1998

Related U.S. Application Data

[63] Continuation of application No. PCT/DE96/01577, Aug. 26, 1996.

[30] Foreign Application Priority Data

Aug. 31, 1995 [DE] Germany .............. 195 32 192

[51] Int. Cl.[7] ............................................ B60R 22/46
[52] U.S. Cl. ............................ 701/45; 701/46; 280/735
[58] Field of Search ................................ 701/45, 46, 47; 280/735, 801.1, 805; 340/436

[56] References Cited

U.S. PATENT DOCUMENTS

| | | | |
|---|---|---|---|
| 3,720,426 | 3/1973 | Johnston | 280/150 AB |
| 5,068,793 | 11/1991 | Condne et al. | 701/45 |
| 5,088,768 | 2/1992 | Furuhashi | 280/803 |
| 5,189,311 | 2/1993 | Moriyama et al. | 307/10.1 |
| 5,225,985 | 7/1993 | Okano | 701/45 |
| 5,415,431 | 5/1995 | Omura | 280/805 |
| 5,461,567 | 10/1995 | Kelley et al. | 701/45 |
| 5,555,174 | 9/1996 | Okimoto et al. | 701/45 |
| 5,606,501 | 2/1997 | Gioutsos et al. | 701/46 |
| 5,801,619 | 9/1998 | Liu et al. | 340/436 |
| 5,815,393 | 9/1998 | Chae | 701/46 |
| 5,868,427 | 2/1999 | Mueller et al. | 280/806 |

FOREIGN PATENT DOCUMENTS

| | | |
|---|---|---|
| 2934749C2 | 5/1987 | Germany . |
| 4207153A1 | 7/1993 | Germany . |
| 3621580C2 | 6/1995 | Germany . |

*Primary Examiner*—Tan Nguyen
*Attorney, Agent, or Firm*—Herbert L. Lerner; Laurence A. Greenberg; Werner H. Stemer

[57] ABSTRACT

A control unit for actuating a device for triggering a seat belt pretensioner in a vehicle when a rear-end impact occurs includes a sensor device for supplying an acceleration signal $a(t)$ determined at least by a positive acceleration of the vehicle in a direction corresponding to the longitudinal axis thereof, an evaluation circuit for evaluating the acceleration signal $a(t)$ as an evaluated signal and for comparing the evaluated signal with a threshold value, and generating thereby a triggering signal $z(t)$ for the triggering device if the threshold value is exceeded by the evaluated signal $y(t)$, the threshold value having a sign provided for the positive vehicle acceleration.

9 Claims, 3 Drawing Sheets

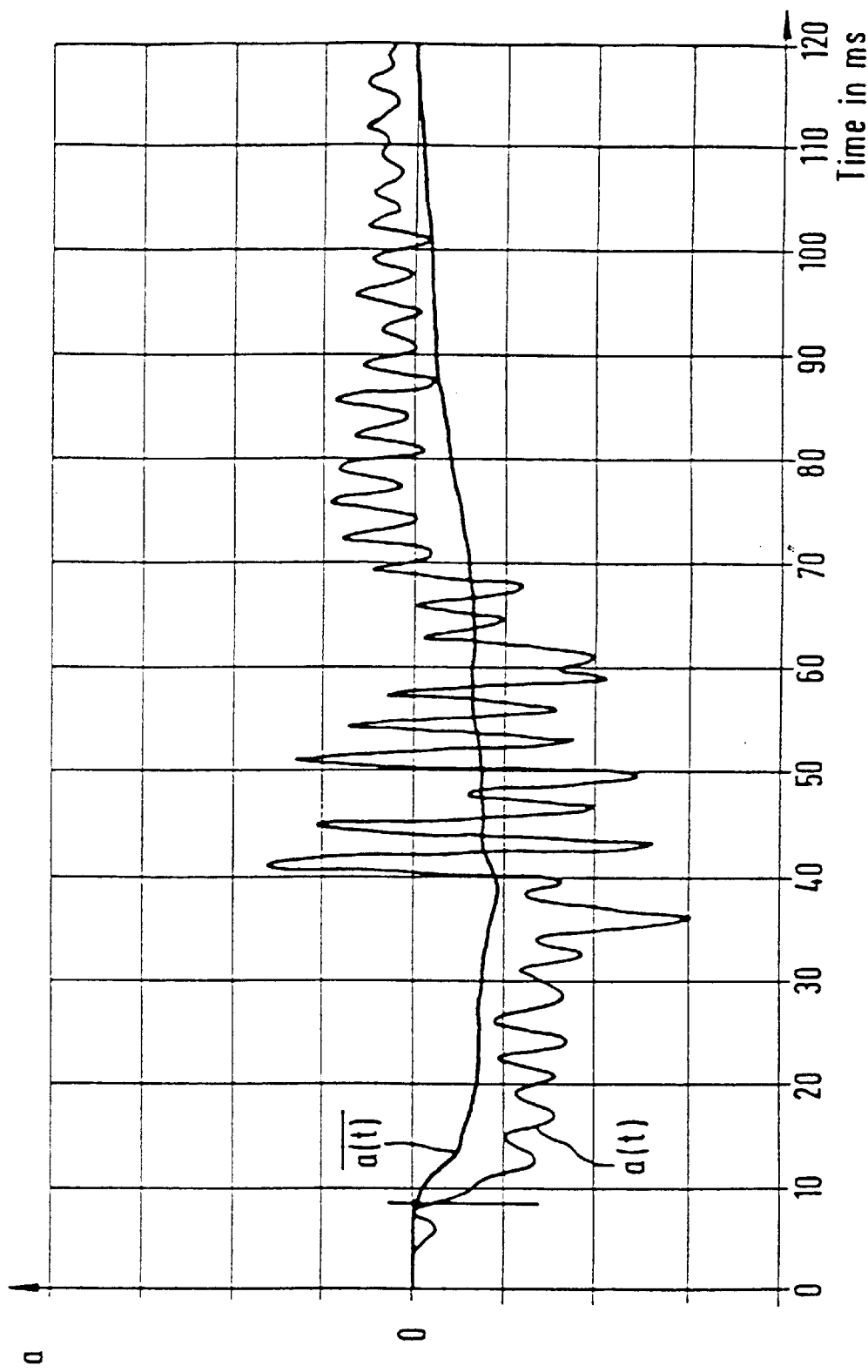

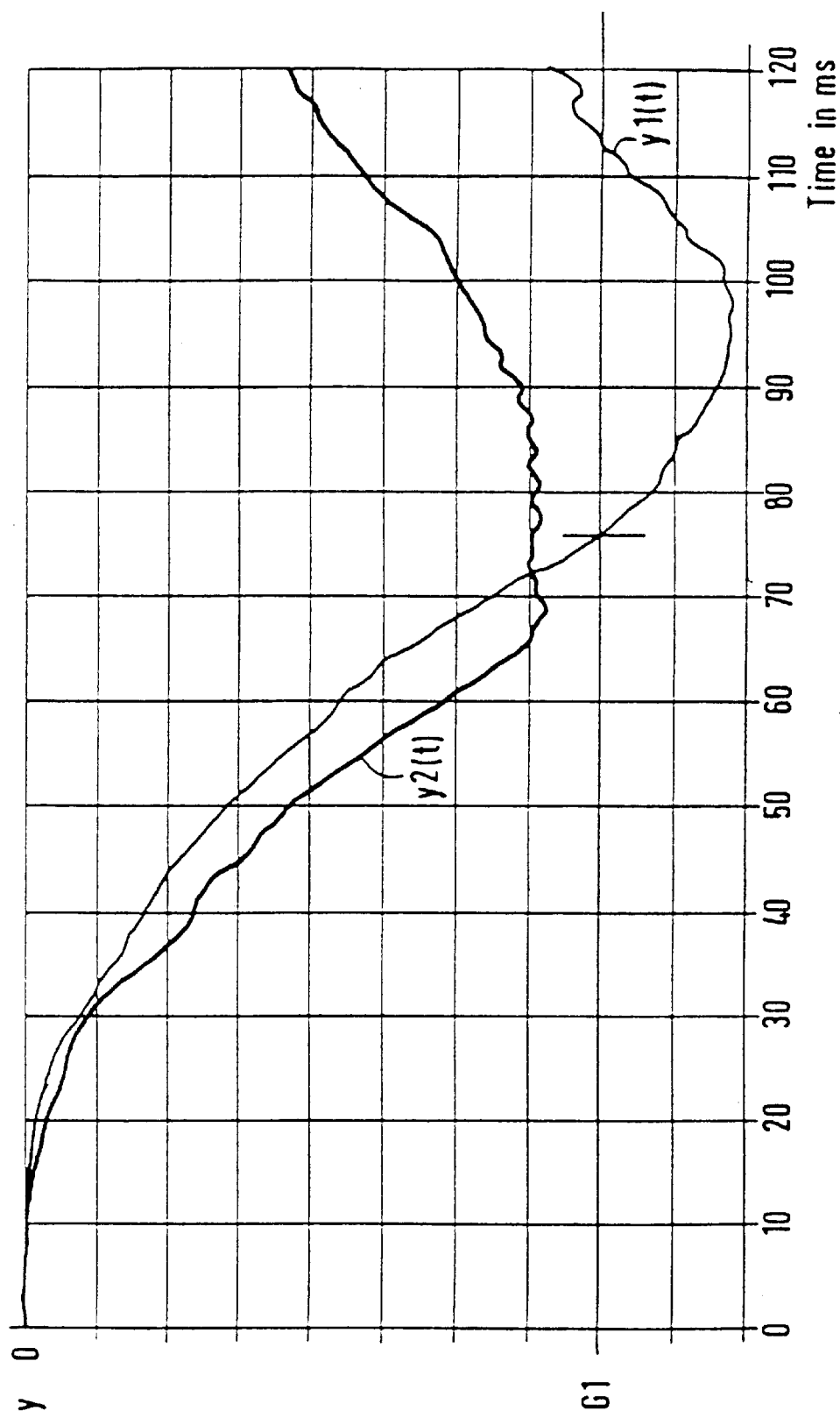

CONTROL UNIT ACTUATING A TRIGGERING DEVICE FOR A SEAT BELT PRETENSIONER IN A VEHICLE

CROSS-REFERENCE TO RELATED APPLICATION

This application is a continuation of international application Ser. No. PCT/DE96/01577, filed Aug. 26, 1996.

BACKGROUND OF THE INVENTION

Field of the Invention

The invention relates to a control unit for actuating a triggering device for a seat belt pretensioner in a vehicle.

Devices for triggering seat belt pretensioning devices or devices for locking seat belts in vehicles, in addition to devices for triggering airbags, are usually actuated when a front-end or oblique impact occurs, so that, as early as possible after the start of the impact, further forward displacement of the vehicle occupants wearing seat belts is prevented. In this way, the vehicle occupants are effectively protected against injuries caused, in particular, when the head of any of the occupants strikes against a part of the interior of the vehicle or when any of the vehicle occupants dive under the belt.

The article "The new seat belt pretensioning system from Volkswagen" by H. Müller, A. Enβlen, J. Günnewig, M. Specht and W. Krauss in the automobile periodical ATZ Automobiltechnischen Zeitschrift, No. 96 (1994), pages 546 to 550, discloses a control unit for actuating a device for triggering a seat belt pretensioner in a vehicle. In this regard, a seat belt device with a safety belt has a control unit arranged directly next to it. Each control unit includes a mechanical sensor device which is constructed as a spring/mass system and is sensitive to vehicle deceleration, and a pyrotechnically operating triggering device. If a sufficiently severe vehicle deceleration caused by a front-end, an offset, a pole or oblique impact is detected, a propellant charge of the triggering device is fired at the earliest possible instant of impact after the impact starts. The seat belt is tightened or tensioned via a cable-actuated coupling.

The published German Patent Document DE 29 34 749 C2 discloses a control unit for actuating a device for locking a seat belt. A sensor device of the control unit senses a vehicle deceleration and, if a sufficiently severe vehicle deceleration is detected, it actuates a contact in a safety circuit of the locking device. In the locking device, the closing of the contact excites an electromagnetic coil and, consequently, moves an armature which effects a mechanical locking of the belt strap of the seat belt.

The published German Patent Document DE 36 21 580 C2 discloses a control unit for actuating a triggering device of a seat belt pretensioning device when a front-end or oblique impact occurs. An acceleration signal which is supplied by a sensor device and which is determined by positive and negative accelerations of the vehicle in the direction of the longitudinal axis thereof is evaluated in an evaluation circuit. The evaluated signal is compared with a threshold value. If the threshold value is exceeded by the evaluated signal, a trigger signal for the triggering device is generated by the evaluation device. The threshold value has the same sign as for the negative vehicle acceleration, so that only a sufficiently negative vehicle acceleration/deceleration, such as is typical for a front-end or lateral impact, can lead to a triggering.

SUMMARY OF THE INVENTION

It is accordingly an object of the invention to provide a control unit for actuating a triggering device for a seat belt pretensioner in a vehicle, which offers a solution to the problem of effectively protecting vehicle occupants wearing seat belts in a vehicle, if an impact should occur.

With the foregoing and other objects in view, there is provided, in accordance with the invention, a control unit for actuating a device for triggering a seat belt pretensioner in a vehicle when a rear-end impact occurs, comprising a sensor device for supplying an acceleration signal $a(t)$ determined at least by a positive acceleration of the vehicle in a direction corresponding to the longitudinal axis thereof, an evaluation circuit for evaluating the acceleration signal $a(t)$ as an evaluated signal and for comparing the evaluated signal with a threshold value, and generating thereby a triggering signal $z(t)$ for the triggering device if the threshold value is exceeded by the evaluated signal $y(t)$, the threshold value having a sign provided for the positive vehicle acceleration.

In accordance with another feature of the invention, the acceleration signal is determined by the positive and negative acceleration of the vehicle, and the evaluation of the acceleration signal is started if a positive vehicle acceleration is detected.

In accordance with a further feature of the invention, the evaluation circuit serves for integrating the acceleration signal $a(t)$ with respect to time and for weighting it with a function $f(t)$ having a greater weighting at late instants of time than at early instants of time.

In accordance with an added feature of the invention, the evaluation circuit serves for integrating the acceleration signal $a(t)$ provided with an additive correction factor and weighted with a time function $f(t)$.

In accordance with an additional feature of the invention, the function $f(t)$ is formed as a linear time function.

In accordance with yet another feature of the invention, the evaluation circuit serves for forming the evaluated signal $y(t)$ when just starting from a starting instant of time, at which a first monitoring signal $u(t)$ which is dependent upon the acceleration signal $a(t)$ exceeds a threshold value assigned thereto.

In accordance with an alternative feature of the invention, the evaluation circuit serves for forming the evaluated signal $y(t)$ when just starting from a starting instant of time, at which the accelerating signal $a(t)$ serving as a first monitoring signal $u(t)$ exceeds a threshold value assigned thereto.

In accordance with yet a further feature of the invention, the evaluation circuit ceases evaluating the evaluated signal $y(t)$ starting from an end instant of time at which a second monitoring signal $v(t)$ which is dependent upon the acceleration signal $a(t)$ drops, for a defined time period, below a threshold value assigned thereto.

In accordance with yet an added feature of the invention, the evaluation circuit serves for forming the second monitoring signal $v(t)$ by integrating over time the acceleration signal $a(t)$ provided with the additive correction factor.

In accordance with a concomitant feature of the invention, the evaluation circuit includes a microprocessor for evaluating as a further evaluated signal $m(t)$ at least another signal $b(t)$ supplied by the sensor device, and wherein a restraining device of the vehicle includes a triggering device for generating a further trigger signal $n(t)$ if an associated threshold value is exceeded by the further evaluated signal $m(t)$.

Heretofore, belt pretensioning devices or locking devices for seat belts have been triggered only whenever a sufficiently severe front-end or oblique impact occurred. In accordance with the invention, however, seat belt pretensioning devices, locking devices or similar devices for seat belts which, hereinafter, are included under the term seat belt pretensioner or pretensioning device, are triggered even if a sufficiently severe rear-end impact is detected.

In the event of a rear-end impact, the vehicle occupant is initially pressed against his or her vehicle seat and it is only at a later time that he or she is displaced forward out of his or her vehicle seat. To this end, a sensor device senses a vehicle acceleration in the direction of the longitudinal axis of the vehicle and supplies an acceleration signal. If a positive vehicle acceleration is detected, an acceleration which is caused, for example, by the accelerator pedal being depressed or by a rear-end impact, an evaluation circuit starts to evaluate the acceleration signal, compares the evaluated signal with a threshold value and, if the threshold value is exceeded by the evaluated signal, triggers a triggering device of the seat belt pretensioner or pretensioning device. The threshold value, in the case at hand, has a sign provided for the positive vehicle acceleration. In this way, the vehicle occupant is effectively protected against injuries even in the event of a rear-end impact.

In practice, a severe rear-end impact, wherein the seat belt pretensioning device should be triggered, occurs if, for example, the impact is caused by a vehicle having a weight of approximately 1100 kilograms and is traveling at a speed of approximately 50 km/h. As a rule, it is not necessary to trigger an airbag in addition to the seat belt tensioning device in the case of a severe rear-end impact, because the major part of the energy transmitted to the vehicle occupant as a result of the impact is absorbed by a backward displacement of the vehicle occupant against the vehicle seat before the vehicle occupant is displaced forward.

The evaluated signal is preferably formed by the acceleration signal which is integrated with respect to time and then weighted with a time function.

As a result of the integration of the acceleration signal over time, irregularities in the acceleration signal, for example, oscillations or brief peaks make only a small contribution to the evaluated signal. Consequently, mistriggering caused by such oscillations or brief peaks is prevented.

The occupant is displaced forward out of his vehicle seat at a relatively late instant of time after the start of the impact. At that instant of time, the average vehicle acceleration has already exceeded its maximum value. As a result, it is advantageous to weight the time integral over the acceleration signal with a time function, in order to be able to trigger at the optimum time.

Therefore, the time function preferably has more weighting at later instants of time than at early instants of time.

Actuation of the triggering device at an optimum time, i.e., relatively late in the case of a rear-end impact, is advantageous in comparison with premature triggering because, after the start of the impact, the evaluation circuit then has a long time period to distinguish between a severe rear-end impact, wherein triggering should take place, and a less severe rear-end impact, wherein triggering should not take place, from the profile or curve of the vehicle acceleration. It is thus possible to prevent mistriggering due to a rear-end impact which turns out to be less severe only in the middle and late sections of the associated acceleration signal. In turn, mistriggering is to be avoided because, in particular, in the case of a pyrotechnically operating triggering device, for the seat belt pretensioner to remain operational, components of the seat belt pretensioning device, for example, a firing unit, must be exchanged at high cost after the seat belt pretensioner has been actuated. Disregarding the foregoing, in the case of mistriggering, noise unnecessarily caused by an explosion of the firing unit is to be prevented from affecting the driver and the vehicle occupants for safety reasons.

The time function is preferably of linear form. Thus, the integral over the acceleration signal is given more weight at late instants of time than at early instants of time. This allows for the start of the forward displacement of a vehicle occupant at a relatively late instant of time, when an average vehicle acceleration is already decaying and, given a suitable selection of the threshold value, leads to an optimum triggering instant of time which, in practice, is approximately 70 to 80 ms after the start of the impact. In comparison, the optimum triggering instant of time for belt pretensioning devices, in the case of a front-end impact, is at approximately 20 to 30 ms.

If the acceleration signal, which is integrated with respect to time and weighted with a time function, is provided with an additive correction term or factor before the integration thereof, the triggering criterion can be adapted to different vehicle types by suitably selecting the threshold value, the additive correction factor and the time function. A skillfully selected additive correction factor can also contribute to differentiating a severe rear-end impact from a less severe rear-end impact, even if a severe rear-end impact and a less severe rear-end impact differ from one another only insignificantly in their associated acceleration signals. The parameters of threshold value, additive correction factor and also the time function can be determined with the aid of simulation experiments.

Other features which are considered as characteristic for the invention are set forth in the appended claims.

Although the invention is illustrated and described herein as embodied in a control unit for actuating a triggering device for a seat belt pretensioner in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 2 is a plot diagram showing a profile or curve of an acceleration signal a(t) which is typical of a rear-end impact, and a profile or curve of an average acceleration signal $\overline{a(t)}$ which is determined from the acceleration signal a(t); and FIG. 3 is a plot diagram showing profiles or curves of two evaluated signals y1(t) and y2(t).

DESCRIPTION OF THE PREFERRED EMBODIMENTS

Figure 1:
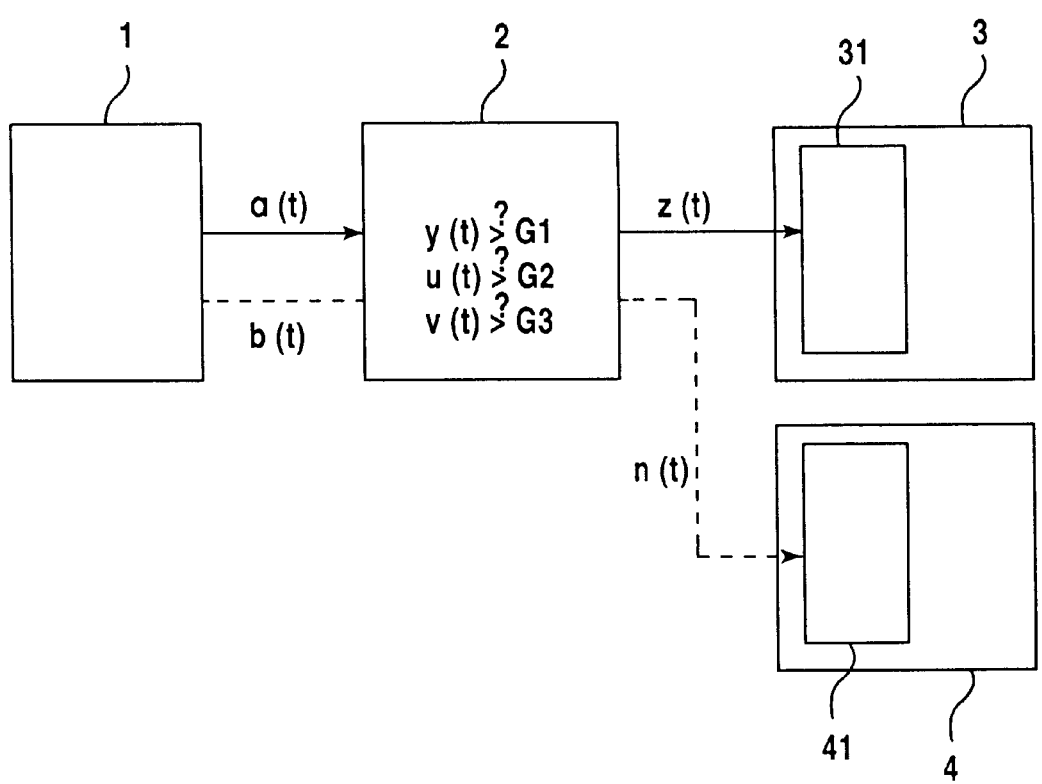
FIG. 1 is a block circuit diagram of a control unit according to the invention.

Referring now to the drawings and, first, particularly to FIG. 1 thereof, there is shown therein a block circuit diagram of a control unit according to the invention having a sensor device 1, an evaluation circuit 2, a seat belt pretensioner 3 with a triggering circuit 31, and a restraining device 4 with an associated triggering circuit 41.

The sensor device 1 supplies an acceleration signal a(t) to the evaluation circuit 2, the signal a(t) being determined by an acceleration of the vehicle in the direction of the longitudinal axis thereof. If the evaluation circuit 2 detects a positive vehicle acceleration, it evaluates the acceleration signal a(t) to obtain an evaluated signal y(t), and compares the evaluated signal y(t) with a threshold value G1, in order to actuate the triggering device 31 of the seat belt pretensioner 3 with a triggering signal z(t) when the threshold value G1 is exceeded by the evaluated signal y(t).

FIG. 2 shows in qualitative terms a profile of an acceleration signal a(t) which is typical of a rear-end impact, and a profile of an average acceleration signal $\overline{a(t)}$ which is determined from the acceleration signal a(t). In FIG. 2, the acceleration signal a(t) has a negative sign for a positive vehicle acceleration.

The sensor device 1 includes, for example, a linear acceleration sensor with a sensitivity axis, which is arranged parallel to the longitudinal axis of the vehicle, or else two linear acceleration sensors which are offset by an angle with respect to the longitudinal axis of the vehicle. The acceleration sensor can operate in accordance with a capacitive, a piezo-resistive or some other principle and delivers an analog or quasi-analog signal.

The sensor device 1 supplies the acceleration signal a(t), which is determined either by a positive and a negative vehicle acceleration, or only by a positive vehicle acceleration. In the first-mentioned case, a positive vehicle acceleration may be distinguished by positive voltage values supplied by the sensor device 1, and a negative vehicle acceleration may be distinguished by negative voltage values. A positive vehicle acceleration can, however, also be distinguished by a first range of positive voltage values, and a negative vehicle acceleration may be distinguished by a second range of positive voltage values. In each case, the sensor device 1 or the evaluation circuit 2 can detect, for example, by a comparison of the acceleration signal a(t) with the detection threshold value, whether a positive vehicle acceleration is present.

Preferably, the evaluation circuit 2 forms a first monitoring signal u(t), which is compared with an appertaining threshold value G2. A starting time ts, at which the evaluation of the acceleration signal a(t) with regard to a rear-end impact by the evaluation circuit 2 is started, is not defined until the threshold value G2 is exceeded by the first monitoring signal u(t). Preferably, the monitoring signal u(t) is the acceleration signal a(t) itself or the acceleration signal a(t) which has been integrated with respect to time. This prevents the starting of the evaluation process when there is a very low positive vehicle acceleration caused, for example, by "stepping on the accelerator pedal".

The acceleration signal a(t) is evaluated by the evaluation circuit 2 in a manner that a correction factor koff is subtracted from the acceleration signal a(t), and the acceleration signal a(t) which is provided with the correction factor koff is integrated with respect to time, starting from the starting time ts, and is multiplied by a time function f(t).

The time function f(t) is preferably linear, that is to say f(t) =t, but may also be quadratic if, for example, the seat belt pretensioner or pretensioning device is to be triggered at a relatively early instant of time. At the instant of the starting time ts, the time function f(t) starts to run with f(t=0), and the integral starts to run. From the starting time instant ts onwards, the evaluated signal $$y(t)=t^* \int (a(t)-\text{koff})dt$$

is formed and compared with the threshold value G1.

FIG. 3 shows profiles of two signals y1(t) and y2(t) which are evaluated in accordance with the aforementioned algorithm, together with the threshold value G1, the evaluated signal y1(t) exceeding the threshold value G1 and thus distinguishing a severe rear-end impact, and the evaluated signal y2(t) not exceeding the threshold value G1 and thus distinguishing a less severe rear-end impact. One of the evaluated signals y1(t) and y2(t) can be based, for example, on an acceleration profile according to FIG. 2. Thus, the integral which is formed over the acceleration signal as the evaluated signal y(t) and is multiplied by a rising time function also has negative values.

Accordingly, the threshold value G1 is also negative. The threshold value G1 can be constant in terms of time, or else at least constant in terms of time at the beginning and variable in terms of time starting from a defined instant of time and can have, for example, the shape of a ramp. The defined instant of time can depend in turn upon the acceleration signal a(t) or upon a signal derived from the acceleration signal.

If the sensor device 1 supplies an acceleration signal a(t) which is determined both by a positive and a negative vehicle acceleration, components of the acceleration signal a(t) which distinguish a negative vehicle acceleration can also be taken into account during the integral formation. These components can easily occur in the case of a rear-end impact, for example, when there are pronounced oscillations in the acceleration signal a(t). These components make contributions with a reversed sign to the integral. Accordingly, for example, an integral value which is formed as a result of a positive vehicle acceleration is reduced again. Negative contributions to the acceleration signal therefore reduce the probability of the evaluated signal exceeding the threshold value. If the negative contributions exceed the positive contributions, the seat belt pretensioner is not triggered, however, because, for triggering in the case of a rear-end impact, there is no provision of a threshold value which is assigned to the contributions of vehicle deceleration.

By skillfully selecting the additive correction term koff, this effect can be utilized to be able to distinguish between a severe rear-end impact and a less severe rear-end impact, even if the associated acceleration signals differ only slightly: typically, a first acceleration signal caused by a less severe rear-end impact has smaller amplitudes in the initial phase thereof and, starting from an instant of time of approximately 40 ms up to an instant of time of approximately 100 ms, it has oscillations with a higher amplitude than a second acceleration signal caused by a severe rear-end impact. A suitable correction term koff, which is subtracted from the acceleration signal a(t), then shifts the first acceleration signal in such a way that, in particular during the initial phase thereof, the impression is given of a negative vehicle acceleration which, in turn, supplies negative integral contributions to the evaluated signal, whereas the second acceleration signal supplies positive integral contributions even after it has been shifted by the correction term koff. Likewise, the pronounced oscillations of the first acceleration signal supply negative integral contributions, whereas the weak oscillations of the second acceleration signal supply positive integral contributions even after the subtraction of the correction term koff.

Preferably, the evaluation of the acceleration signal a(t) by the evaluation circuit 2 is aborted at an end instant of time te, which is determined by a second monitoring signal v(t) dropping below a threshold value G3 for a time period tx. The second monitoring signal v(t) is formed, in this case, by time integration over the acceleration signal a(t), it being possible also to provide the acceleration signal a(t) with the additive correction term koff. The fixing of the end instant of time te is advantageous because, as the time progresses, the time function f(t) supplies large contributions which are multiplied by the integrated vehicle acceleration, with the result that there is the risk of the evaluated signal y(t) exceeding the threshold value G1 at a very late instant of time, and the seat belt pretensioner being triggered only as a result of a large contribution of the time function f(t) to the evaluated signal y(t), but not as a result of a sufficiently strong acceleration signal a(t).

The parameters of the correction term koff, all the threshold values G1, G2, G3 and the form of the time function f(t) can be used to influence the optimum triggering instant of time and adapt the evaluation of the acceleration signal a(t) to individual vehicle properties.

Preferably, the evaluation circuit 2 contains a microprocessor. Before the evaluation of the acceleration signal a(t) in the microprocessor, the acceleration signal a(t) is filtered and sampled. The microprocessor can also evaluate the acceleration signal a(t) and/or a further signal b(t) supplied by the sensor device 1 (FIG. 1) according to further algorithms, specifically in parallel with the evaluation of the acceleration signal a(t) with respect to a rear-end impact, with the result that, for example, when a further threshold value G4 is exceeded by a further evaluated signal m(t), a further triggering signal n(t) is generated for a triggering device 41 of a restraining device 4 of the vehicle. The restraining device 4 can be, for example, a driver airbag or front-seat passenger airbag, a side airbag or the seat belt pretensioner which is also intended to be triggered in the case of a front-end or oblique impact. The control unit with a sensor device, and the evaluation circuit thereof is preferably arranged centrally in the vehicle.

I claim:

1. A control unit for actuating a device for triggering a seat belt pretensioner in a vehicle when a rear-end impact occurs, comprising:

a sensor device for supplying an acceleration signal a(t) determined at least by a positive acceleration of the vehicle in a direction corresponding to the longitudinal axis thereof, and an evaluation circuit forming an evaluated signal by integrating said acceleration signal a(t) with respect to time to form an integration and weighting said integration by multiplying said integration by a function f(t) having a greater weighting at later instants of time than at earlier instants of time; said evaluation circuit comparing the evaluated signal with a threshold value; and said evaluation circuit generating thereby a triggering signal z(t) for the triggering device if the threshold value is exceeded by the evaluated signal y(t), the threshold value having a sign provided for the positive vehicle acceleration.

2. The control unit according to claim 1, wherein the acceleration signal is determined by the positive and negative acceleration of the vehicle, and wherein the evaluation of the acceleration signal is started if a positive vehicle acceleration is detected.

3. The control device according to claim 1, wherein said evaluation circuit serves for integrating the acceleration signal a(t) provided with an additive correction factor and weighted with a time function f(t).

4. The control unit according to claim 1, wherein the function f(t) is formed as a linear time function.

5. The control unit according to claim 1, wherein said evaluation circuit serves for forming the evaluated signal y(t) when just starting from a starting instant of time, at which a first monitoring signal u(t) which is dependent upon the acceleration signal a(t) exceeds a threshold value assigned thereto.

6. The control unit according to claim 5, wherein said evaluation circuit ceases evaluating the evaluated signal y(t) starting from an end instant of time at which a second monitoring signal v(t) which is dependent upon the acceleration signal a(t) drops, for a defined time period, below a threshold value assigned thereto.

7. The control unit according to claim 6, wherein said evaluation circuit serves for forming the second monitoring signal v(t) by integrating over time the acceleration signal a(t) provided with the additive correction factor.

8. The control unit according to claim 1, wherein said evaluation circuit serves for forming the evaluated signal y(t) when just starting from a starting instant of time, at which the accelerating signal a(t) serving as a first monitoring signal u(t) exceeds a threshold value assigned thereto.

9. The control unit according to claim 1, wherein said evaluation circuit includes a microprocessor for evaluating as a further evaluated signal m(t) at least another signal b(t) supplied by said sensor device, and wherein a restraining device of the vehicle includes a triggering device for generating a further trigger signal n(t) if an associated threshold value is exceeded by the further evaluated signal m(t).

* * * * *